United States Patent
Chen

(10) Patent No.: US 10,525,679 B2
(45) Date of Patent: Jan. 7, 2020

(54) POLYMER INTERLAYERS COMPRISING A COMPATIBILIZER

(71) Applicant: Solutia Inc., St. Louis, MO (US)

(72) Inventor: Wenjie Chen, Amherst, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 15/839,990

(22) Filed: Dec. 13, 2017

(65) Prior Publication Data

US 2018/0111358 A1    Apr. 26, 2018

Related U.S. Application Data

(63) Continuation of application No. 14/527,745, filed on Oct. 29, 2014, now Pat. No. 9,849,654.

(51) Int. Cl.
| | | |
|---|---|---|
| *C08L 29/14* | (2006.01) | |
| *B32B 27/18* | (2006.01) | |
| *B32B 27/08* | (2006.01) | |
| *B32B 27/28* | (2006.01) | |
| *B32B 27/22* | (2006.01) | |
| *B32B 27/30* | (2006.01) | |
| *B32B 27/42* | (2006.01) | |
| *B32B 17/10* | (2006.01) | |
| *C08K 5/1539* | (2006.01) | |

(52) U.S. Cl.
CPC ........ *B32B 27/28* (2013.01); *B32B 17/10688* (2013.01); *B32B 17/10761* (2013.01); *B32B 27/08* (2013.01); *B32B 27/18* (2013.01); *B32B 27/22* (2013.01); *B32B 27/302* (2013.01); *B32B 27/306* (2013.01); *B32B 27/42* (2013.01); *C08K 5/1539* (2013.01); *C08L 29/14* (2013.01); *B32B 2250/02* (2013.01); *B32B 2250/24* (2013.01); *B32B 2270/00* (2013.01); *B32B 2307/102* (2013.01); *B32B 2307/412* (2013.01); *B32B 2307/558* (2013.01); *B32B 2307/56* (2013.01); *B32B 2457/12* (2013.01); *B32B 2605/006* (2013.01); *C08L 2205/025* (2013.01)

(58) Field of Classification Search
CPC .................. C08L 29/14; C08L 2205/08; C08L 2205/025; C08K 5/1539; B32B 27/22; B32B 27/28; B32B 27/42; B32B 27/306
See application file for complete search history.

(56) References Cited

U.S. PATENT DOCUMENTS

| | | | |
|---|---|---|---|
| 2,282,026 A | 5/1942 | Bren et al. | |
| 2,282,057 A | 5/1942 | Hopkins | |
| 5,137,954 A | 8/1992 | DasGupta et al. | |
| 5,190,826 A | 3/1993 | Asahina et al. | |
| 5,290,660 A | 3/1994 | Eian et al. | |
| 5,728,472 A | 3/1998 | D'Errico | |
| 6,187,845 B1 | 2/2001 | Renz et al. | |
| 6,506,835 B1 | 1/2003 | Hofmann | |
| 6,887,577 B1 | 5/2005 | Keller | |
| 6,982,296 B2* | 1/2006 | Keller | B32B 17/10036 428/411.1 |
| 7,510,771 B2 | 3/2009 | Lu | |
| 8,431,047 B2 | 4/2013 | Ootsuki et al. | |
| 9,023,930 B2 | 5/2015 | Ootsuki | |
| 9,248,626 B2 | 2/2016 | Lu | |
| 9,636,894 B2 | 5/2017 | Lu | |
| 2003/0139520 A1 | 7/2003 | Toyama | |
| 2004/0065229 A1 | 4/2004 | Papenfuhs | |
| 2005/0049341 A1 | 3/2005 | Grass | |
| 2008/0268270 A1 | 10/2008 | Chen | |
| 2010/0206374 A1* | 8/2010 | Karpinski | B32B 17/10688 136/256 |
| 2013/0022824 A1 | 1/2013 | Meise et al. | |
| 2013/0075949 A1 | 3/2013 | Chen | |
| 2014/0138580 A1 | 5/2014 | Mizumura et al. | |
| 2014/0364550 A1 | 12/2014 | Lu | |
| 2016/0053102 A1 | 2/2016 | Asanuma et al. | |
| 2016/0096349 A1 | 4/2016 | Lu | |
| 2016/0111077 A1 | 4/2016 | Lu | |
| 2016/0122526 A1* | 5/2016 | Chen | B32B 27/08 428/501 |
| 2016/0160022 A1 | 6/2016 | Lu | |

FOREIGN PATENT DOCUMENTS

| | | |
|---|---|---|
| WO | WO 2010108975 A1 | 9/2010 |
| WO | WO 2014/200993 A1 | 12/2014 |

OTHER PUBLICATIONS

ASTM International Designation: D1003-13; "Standard Test Method for Haze and Luminous Transmittance of Transparent Plastics"; Nov. 2013.

(Continued)

*Primary Examiner* — Karuna P Reddy
(74) *Attorney, Agent, or Firm* — Michelle Bugbee

(57) ABSTRACT

A polymer composition comprising a first poly(vinyl butyral) resin having a first residual hydroxyl content; a second poly(vinyl butyral) resin having a second residual hydroxyl content; a plasticizer; and at least one compatibilizer, such as an anhydride compatibilizer; wherein the difference between the first and second residual hydroxyl contents is at least 2 wt. %, and wherein the polymer composition has a percent haze of less than 5%. The use of a compatibilizer reduces or minimizes the optical defects, such as haze and color, without sacrificing other characteristics of the composition. The composition may be used in an interlayer.

5 Claims, No Drawings

(56) References Cited

OTHER PUBLICATIONS

ASTM International Designation: D1396-94 (Reapproved 1998); Standard Test Methods for Chemical Analysis of Poly(Vinyl Butyral); Jul. 1992.
Bendaoud, Amine et al.; Blends of Plasticized Polyvinyl Butyral and Polyvinyl Chloride: Morphology Analysis in View of Recycling; Macromolecular Materials and Engineering Journal, 298; pp. 1259-1268; 2013.
Piirma, I; "Polymeric Surfactants"; Surfactant Science Series, vol. 42, p. 221; 1992.
Wade, B. E.; "Vinyl Acetal Polymers"; Encyclopedia of Polymer Science & Technology, 3rd Edition, vol. 8, pp. 381-399; 2003.
Co-pending U.S. Appl. No. 14/562,829, filed Dec. 8, 2014, Jun Lu; now U.S. Pat. No. 9,840,617.
Co-pending U.S. Appl. No. 14/562,832, filed Dec. 8, 2014, Wenjie Chen et al.; now U.S. Publucation 2016/0160023.
Co-pending U.S. Appl. No. 15/834,603, filed Dec. 7, 2017, Jun Lu.
Notification of Transmittal of the International Search Report and the Written Opinion of the International Searching Authority, or the Declaration dated Feb. 3, 2016 received in International Application No. PCT/US2015/056857.
Notification of Transmittal of the International Search Report and the Written Opinion of the International Searching Authority, or the Declaration dated Mar. 11, 2016 received in International Application No. PCT/US2015/063879.
Co-pending U.S. Appl. No. 16/015,819, filed Jun. 22, 2018, Chen, et al.; now U.S. Publication No. 2018-0298180.
Co-pending U.S. Appl. No. 16/169,409, filed Oct. 24, 2018, Jun Lu.; now U. S. Publication No. 2019-0055391.

* cited by examiner

POLYMER INTERLAYERS COMPRISING A COMPATIBILIZER

CROSS-REFERENCE TO RELATED APPLICATION

This application is a continuation of U.S. patent application Ser. No. 14/527,745, filed on Oct. 29, 2014, now U.S. Patent Publication Number 2016-0122526, the disclosure of which is incorporated herein by reference in its entirety.

BACKGROUND OF THE INVENTION

Field of the Invention

This disclosure is related to the field of polymer interlayers for multiple layer panels and multiple layer panels having at least one polymer interlayer sheet. Specifically, this disclosure is related to the field of polymer interlayers comprising a compatibilizer.

Description of Related Art

Multiple layer panels are generally panels comprised of two sheets of a substrate (such as, but not limited to, glass, polyester, polyacrylate, or polycarbonate) with one or more polymer interlayers sandwiched there between. The laminated multiple layer glass panels are commonly utilized in architectural window applications and in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Additionally, the interlayer may also give the glass a much higher sound insulation rating, reduces UV and/or IR light transmission, and enhances the aesthetic appeal of the associated window. In regard to the photovoltaic applications, the main function of the interlayer is to encapsulate the photovoltaic solar panels which are used to generate and supply electricity in commercial and residential applications.

In order to achieve the desired and optimal sound insulation for the glass panel, it has become common practice to utilize multilayered interlayers with at least one soft "core" layer sandwiched between two more rigid "skin" layers. Theses layers of the interlayer are generally produced by mixing a polymer resin such as poly(vinyl butyral) with one or more plasticizers and melt processing the mix into a sheet by any applicable process or method known to one of skill in the art, including, but not limited to, extrusion, with the layers being combined by processes such as co-extrusion and lamination. Other additional ingredients may optionally be added for various other purposes. After the interlayer sheet is formed, it is typically collected and rolled for transportation and storage and for later use in the multiple layer glass panel, as discussed below.

Contemplated polymer interlayers include, but are not limited to, polyvinyl acetals (PVA) (such as poly(vinyl butyral) (PVB) or poly(vinyl isobutyral), an isomer of poly(vinyl butyral) (which may be referred as PViB or PVisoB), polyurethane (PU), poly(ethylene-co-vinyl acetate) (EVA), polyvinylchloride (PVC), polyethylenes, polyolefins, ethylene acrylate ester copolymers, poly(ethylene-co-butyl acrylate), copolyesters, silicone elastomers, epoxy resins, and any acid copolymers such as an ethylene/carboxylic acid copolymer and its ionomers, derived from any of the foregoing possible thermoplastic resins. PVB and its isomer polyvinyl isobutyral, polyvinyl chloride, ionomers, and polyurethane are preferred polymers generally for interlayers.

Multilayer laminates can include multiple layer glass panels and multilayer polymer films. In certain embodiments, the multiple polymer films in the multilayer laminates may be laminated together to provide a multilayer film or interlayer. In certain embodiments, these polymer films may have coatings, such as metal, silicone or other applicable coatings known to those of ordinary skill in the art. The individual polymer films which comprise the multilayer polymer films may be laminated together using an adhesive as known to those of ordinary skill in the art.

The interlayer may be a single layer, a combination of more than one single layer, a multilayer that has been coextruded, multiple layers laminated together to form a multilayer interlayer, a combination of at least one single layer and at least one multilayer, or a combination of multilayer sheets.

The following offers a simplified description of the manner in which multiple layer glass panels are generally produced in combination with the interlayers. First, at least one polymer interlayer sheet (single or multilayer) is placed between two substrates and any excess interlayer is trimmed from the edges, creating an assembly. It is not uncommon for multiple polymer interlayer sheets or a polymer interlayer sheet with multiple layers (or a combination of both) to be placed within the two substrates creating a multiple layer glass panel with multiple polymer interlayers. Then, air is removed from the assembly by an applicable process or method known to one of skill in the art; e.g., through nip rollers, vacuum bag or another deairing mechanism. Additionally, the interlayer is partially press-bonded to the substrates by any method known to one of ordinary skill in the art. In a last step, in order to form a final unitary structure, this preliminary bonding is rendered more permanent by a high temperature and pressure lamination process, or any other method known to one of ordinary skill in the art such as, but not limited to, autoclaving.

Often, polymer interlayers that do not meet all of the desired properties (for example, off grade material that does not meet at least one property specification) or polymer interlayer trim, (both referred to hereinafter as "recycle" or "recycled" material) may be recycled during the production process, such as during the extrusion process. The recycled material may be fed directly back into the extruder or mixer, or it may be further processed, such as chopped into small pieces or processed into pellets or other shapes, and then mixed with the resin(s) and plasticizer (and any other additives) prior to the extruder or other mixing device. Depending on the particular quality problem (such as contamination, moisture level, color, and the like), different levels of recycled material may be used. For example, if the recycled material has a high level of haze, lower levels may be incorporated into the mixture so that the recycled material does not increase the haze level in the final product, or if the recycled material includes multiple resin types and/or multiple plasticizers, the recycled material may be incompatible with the particular product being produced. For example, PVB formulations containing non-standard plasticizer and/or PVB resin having different residual hydroxyl levels will not be compatible with the standard formulations.

Poly(vinyl butyral) (PVB) is a copolymer containing vinyl acetate, vinyl alcohol and vinyl butyral components.

The vinyl acetate component is the result of residual groups remaining after the hydrolysis of poly(vinyl acetate) to form poly(vinyl alcohol). The poly(vinyl alcohol) is then used in the process. The vinyl alcohol component is the result of residual groups remaining after acetalizing the poly(vinyl alcohol) with butyraldehyde to form poly(vinyl butyral). The content of residual vinyl acetate components in commercial grade PVB is generally in the range of about 1 to 15 wt. %, more commonly less than 4 wt. %. In the past, standard commercial grade PVB for multiple layer glass panels generally had a residual vinyl alcohol (also referred to as residual hydroxyl) content (% PVOH) of about 18 to 21 wt. %, more commonly about 18 to 19.5 wt. %. More recently, development of multilayer polymer interlayers for laminated glass has introduced different and more complicated product configurations, especially in polymer interlayers used to help improve acoustic properties (noise reduction) of the polymer interlayer and the final multiple layer glass panel. Multiple layer polymer interlayers are often produced from multiple different resins each having a different residual vinyl alcohol and/or residual vinyl acetate level. These multiple layer polymer interlayers have been developed to provide improved acoustical performance while retaining many of the other standard safety glass performance functions. In such multiple layer polymer interlayers used to improve acoustic performance (among other improvements), the resin used in the core (or inner) layer often has very low residual vinyl alcohol content, such as % PVOH of about 10 to 11 wt. %, while the resin used in the skin (outer) layer(s) may have a residual vinyl alcohol content (% PVOH) of about 18 to 19.5 wt. %. Other variations, different numbers of resins, or resins having different levels of residual vinyl alcohol content may also be used. Additionally, the multilayer interlayer may have different configurations of resins in the individual layers as desired, such as, for example a core layer resin having a higher % PVOH (such as 19.5 to 30 wt. %) than the skin layer (having lower residual vinyl alcohol content, such as % PVOH of about 10 to 19.5 wt. %).

One of the problems in the manufacture of polymer interlayers using certain types, or mixtures of certain types, of resins or recycled interlayer sheet comprising different resin and/or plasticizer types is haze or poor optical clarity. Haze is caused by a number of different factors, but one cause is the difference in levels of residual hydroxyl content in the resins used to produce the polymer interlayers. Different types of resins are used to produce polymer interlayers with different performance properties, such as adhesion, impact resistance, acoustic properties, mechanical properties, as well as other properties. The different resin types may have different levels of residual hydroxyl content, residual vinyl acetate content, or even different aldehydes if they were acetalized with different aldehyde groups. These different resins may also have different refractive indices.

The refractive index of a substance, such as an interlayer, is the measure of the speed of light through the substance with respect to the speed of light in vacuum. If there is a difference between the refractive index of the layers of a multiple layer interlayer, for example, because different resins are being used in the individual layers, then when the multilayer interlayer is recycled (melt mixing back into the polymer interlayer), the resulting polymer interlayer will often have high haze due to incompatibility between different resins.

Clarity of the interlayer, and more importantly, the glazing or multiple layer panel, is one of the critical quality parameters. Clarity is determined by measuring the level of haze in the multiple layer panel, as further described below. The level of haze must be very low so that the multiple layer panel is clear (and often transparent). In addition to haze, there are other optical quality defects, such as visible optical defects in the interlayer, that cause light scattering and make the defect visible to the eye that may cause optical distortion in the glass panel as well. Both haze and other visible optical defects are caused by light scattering due to the blending or mixing different polymers or plasticizer together, or the contamination from such different polymers and/or plasticizer where there is a sufficiently large difference in the refractive index between the different polymers or plasticizers, or the matrix and the contaminants.

The presence of haze or other optical quality defects in the final unitary structure of a multilayer laminate glass panel can be problematic because a certain degree of optical quality is necessary in many (if not most) of the end-use commercial applications of multilayer laminate glass panels (e.g., vehicular, aeronautical and architectural applications). Thus, the creation of multilayer laminate glass panels with commercially acceptable levels of low haze and good clarity is paramount in the art of multiple layer glass panel manufacturing. Because of the different properties and types of resins used to produce multiple layer polymer interlayers, such as a trilayer polymer interlayer having a soft core layer and harder skin layers, the multiple layer polymer interlayers, are difficult to reuse or recycle in large quantities. Only small amounts or percentages of the multiple layer polymer interlayers have been successfully used in the past. Additionally, it is often hard to reuse or recycle large quantities of unknown or varying recycle materials for the same reasons because the materials may be incompatible.

Other methods for recycling multilayer materials having different resin types have also been tried. For example, attempts to separate the resin and plasticizer by extraction of the plasticizer and recovery of the resin has been tried, but the process is not cost effective and is very resource intensive. The recycle materials could be used for other applications where haze and/or clarity are not a concern, but most times this approach is not economical because the PVB interlayer would then be sold at a lower value and would lose too much of its original value.

Summarized, optical quality defects such as haze and other visible optical defects are common problems in the field of multiple layer glass panels, particularly those used in applications which require higher levels of optical or visual quality. It is now common to use a multilayer interlayer in order to provide high performance laminates having specialized properties, such as improved acoustics. The use of multilayer interlayers, however, very often results in difficulties when attempting to recycle the multilayer materials because only a small amount of the recycle material could be recycled due to optical problems, such as haze and/or other optical quality defects. As a result, large quantities of recycle materials have to be disposed of in other ways, such as sale at reduced value or by landfilling, with little or no value (and potentially an added cost). Accordingly, there is a need in the art for improving the recyclability of multiple layer polymer interlayer without a reduction in optical, mechanical, and acoustic characteristics of a polymer interlayer, and a need for the development of process to recycle multiple layer polymer interlayer.

SUMMARY OF THE INVENTION

Because of these and other problems in the art, described herein, among other things is a polymer composition comprising: a first and a second poly(vinyl butyral) resin, wherein the poly(vinyl butyral) resins have different residual hydroxyl contents; at least one plasticizer and at least one compatibilizer. The polymer composition has a percent haze of less than 5%.

In an embodiment, a polymer composition comprises: a first poly(vinyl butyral) resin having a first residual hydroxyl content; a second poly(vinyl butyral) resin having a second residual hydroxyl content; a plasticizer; and at least one compatibilizer; wherein the difference between the first and second residual hydroxyl contents is at least 2 wt. %, and wherein the polymer composition has a percent haze of less than 5% (as measured in accordance with ASTM D1003-Procedure B using Illuminant C). In embodiments, the polymer composition comprises from about 0.01 wt. % to about 10 wt. % compatibilizer, or from about 0.05 to about 5 wt. % compatibilizer. In embodiments, the difference between the first and second residual hydroxyl contents is at least 3 wt. %, or at least 4 wt. %, or at least 5 wt. %, or at least 6 wt. %, or at least 7 wt. %, or at least 8 wt. % or more. In embodiments, the polymer composition has a percent haze of less than about 4.5%, or less than about 4%, or less than about 3.5%, or less than about 3%, or less than about 2.5%, or less than about 2%, or less than about 1.5%, or less than about 1%, or less than about 0.5%.

In embodiments, the compatibilizer is an anhydride compatibilizer. In embodiments, the compatibilizer comprises at least two anhydrides.

In embodiments, the compatibilizer comprises at least one anhydride having Structure (3), Structure (4), Structure (5) or Structure (6):

Structure (3):

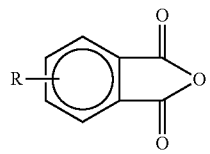

(3)

Structure (4):

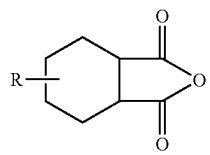

(4)

Structure (5):

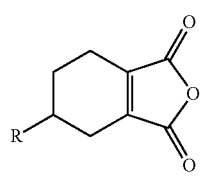

(5)

Structure (6):

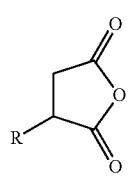

(6)

wherein R may be hydrogen or a saturated or unsaturated carbon chain of from 1 to 16 carbon atoms.

In an embodiment, the compatibilizer is at least one of hexahydro-4-methylphthalic anhydride, hexahydrophthalic anhydride, phthalic anhydride, 3,4,5,6-tetrahydrophthalic anhydride, or 2-octen-1-ylsuccinic anhydride. In an embodiment, the compatibilizer comprises a mixture of hexahydrophthalic anhydride and hexahydro-4-methylphthalic anhydride.

In an embodiment, a multiple layer polymer interlayer comprising: a first layer comprising a first poly(vinyl butyral) resin having a first residual hydroxyl content and a plasticizer; a second layer comprising a second poly(vinyl butyral) resin having a second residual hydroxyl content and a third poly(vinyl butyral) resin having a third residual hydroxyl content, a plasticizer, and at least one compatibilizer; wherein the difference between the second and third residual hydroxyl contents is at least 2 wt. %, and wherein the polymer interlayer has a percent haze of less than 5% (as measured in accordance with ASTM D1003-Procedure B using Illuminant C). In embodiments, the polymer composition comprises from about 0.01 wt. % to about 10 wt. % compatibilizer, or from about 0.05 to about 5 wt. % compatibilizer. In embodiments, the difference between the first and second residual hydroxyl contents is at least 3 wt. %, or at least 4 wt. %, or at least 5 wt. %, or at least 6 wt. %, or at least 7 wt. %, or at least 8 wt. % or more. In embodiments, the polymer composition has a percent haze of less than about 4.5%, or less than about 4%, or less than about 3.5%, or less than about 3%, or less than about 2.5%, or less than about 2%, or less than about 1.5%, or less than about 1%, or less than about 0.5%.

In embodiments, the compatibilizer is an anhydride compatibilizer. In embodiments, the compatibilizer comprises at least two anhydrides.

In embodiments, the compatibilizer comprises at least one anhydride having Structure (3), Structure (4), Structure (5) or Structure (6):

Structure (3):

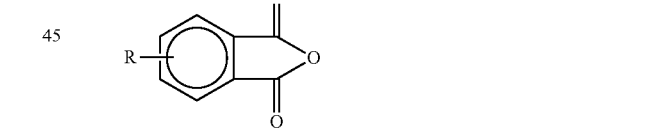

(3)

Structure (4):

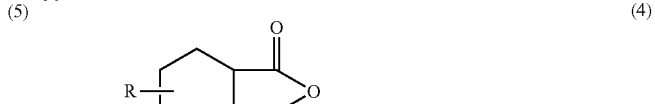

(4)

Structure (5):

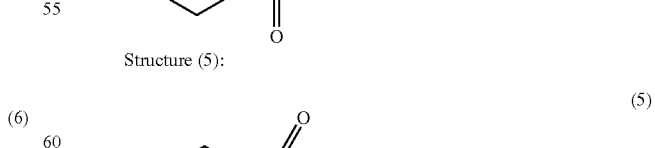

(5)

Structure (6):

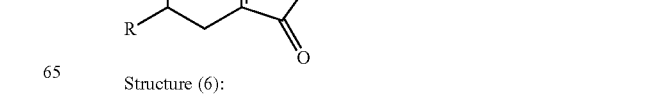

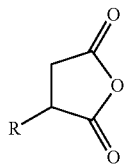

wherein R may be hydrogen or a saturated or unsaturated carbon chain of from 1 to 16 carbon atoms.

In an embodiment, the compatibilizer is at least one of hexahydro-4-methylphthalic anhydride, hexahydrophthalic anhydride, phthalic anhydride, 3,4,5,6-tetrahydrophthalic anhydride, or 2-octen-1-ylsuccinic anhydride. In an embodiment, the compatibilizer comprises a mixture of hexahydrophthalic anhydride and hexahydro-4-methylphthalic anhydride.

In an embodiment, a polymer composition comprises: a first poly(vinyl butyral) resin having a first residual hydroxyl content; a second poly(vinyl butyral) resin having a second residual hydroxyl content; a plasticizer; and from 0.01 to 10 wt. % of at least one anhydride compatibilizer; wherein the difference between the first and second residual hydroxyl contents is at least 2 wt. %, and wherein the polymer composition has a percent haze of less than 5% (as measured in accordance with ASTM D1003-Procedure B using Illuminant C). In embodiments, the difference between the first and second residual hydroxyl contents is at least 3 wt. %, or at least 4 wt. %, or at least 5 wt. %, or at least 6 wt. %, or at least 7 wt. %, or at least 8 wt. % or more. In embodiments, the polymer composition has a percent haze of less than about 4.5%, or less than about 4%, or less than about 3.5%, or less than about 3%, or less than about 2.5%, or less than about 2%, or less than about 1.5%, or less than about 1%, or less than about 0.5%. In embodiments, the polymer composition comprises from about 0.05 to about 5 wt. % compatibilizer.

In embodiments, the compatibilizer is an anhydride compatibilizer. In embodiments, the compatibilizer comprises at least two anhydrides.

In embodiments, the compatibilizer comprises at least one anhydride having Structure (3), Structure (4), Structure (5) or Structure (6):

Structure (3):

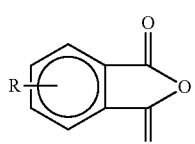

Structure (4):

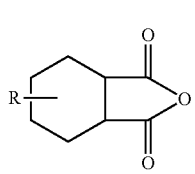

Structure (5):

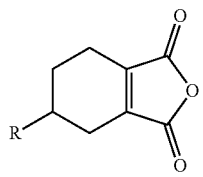

Structure (6):

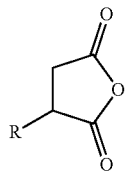

wherein R may be hydrogen or a saturated or unsaturated carbon chain of from 1 to 16 carbon atoms.

In an embodiment, the compatibilizer is at least one of hexahydro-4-methylphthalic anhydride, hexahydrophthalic anhydride, phthalic anhydride, 3,4,5,6-tetrahydrophthalic anhydride, or 2-octen-1-ylsuccinic anhydride. In an embodiment, the compatibilizer comprises a mixture of hexahydrophthalic anhydride and hexahydro-4-methylphthalic anhydride.

In an embodiment, a polymer interlayer comprises the polymer composition. In an embodiment, a multiple layer glass panel comprises the polymer interlayer comprising the polymer composition.

In certain embodiments, the rigid substrate is glass. In other embodiments, the panel may further comprise a photovoltaic cell, with the interlayer encapsulating the photovoltaic cell.

DESCRIPTION OF THE PREFERRED EMBODIMENT(S)

Described herein, among other things, are compositions comprised of mixed thermoplastic resins (poly(vinyl butyral)) having different residual vinyl alcohol contents, a conventional plasticizer, and at least one compatibilizer, wherein the composition has excellent clarity. The composition may be used, for example, in a polymer interlayer. The use of compatibilizer herein significantly increases the compatibility between different poly(vinyl butyral) resins having different residual vinyl alcohol contents, and creates composition containing multiple PVB resins having low haze without sacrificing other characteristics. In this regard, the compatibilizer(s), when selected as a certain type and to have certain properties results in a composition, and in some embodiments an interlayer, having excellent optical clarity as measured by at least haze. As a result, higher quality, optically clear multiple layer glass panels are produced, more material is recycled, and operational efficiency is improved due to the ability to recycle material.

Multilayer interlayers, such as a trilayer interlayer, often comprise a soft core (inner) layer specifically designed for acoustic attenuation with stiffer skin or outer layers. In the interlayer, the plasticizer (such as triethylene glycol di-(2-ethylhexanoate) (3GEH)) in the core and skin layers often partitions (as it reaches equilibrium state) in favor of the softer layer over the stiffer or harder layer, in a proportion predominated by the characteristics of resins used in skin and core layers. Additionally, to produce the softer core and stiffer skin layers, resins having different residual hydroxyl content, and often widely different hydroxyl content, are used in the layers. When the multilayer interlayer is then recycled and added back into the mixture for re-extrusion, the combination of different resins having potentially greatly different residual hydroxyl content or the combination of multiple different resins having different plasticizer types and amounts and/or different residual hydroxyl contents causes haze due to the incompatibility of the resins.

To illustrate the difference, a simplified example of this can be shown. In PVB resin, there are vinyl alcohol segments and vinyl butyral segments. As an example, if the resin used to produce the skin layer has a residual hydroxyl content of from about 18 to 19 wt. %, and the core layer has a much lower residual hydroxyl level, such as about 10% to 11 wt. %, to produce the softer core, then the number of vinyl alcohol segments is considerably different in the core and skin layers (8 to 9 wt. % different).

In their simplest form, the resins used for the skin and core layers are shown in as Structures (1) and (2).

layered interlayer, on the other hand, may comprise multiple layers, including separately extruded layers, co-extruded layers, or any combination of separately and co-extruded layers. Thus the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; and a combination of at least one plural-layer sheet and at least one co-extruded sheet.

In various embodiments, the polymer composition may be used in an interlayer that is a single or monolithic interlayer comprising two or more resins (as discussed above). In embodiments, the single layer interlayer may comprise two or more PVB resins having different levels of residual hydroxyl content (such as where the difference between the residual hydroxyl contents is at least 2 wt. %), or the interlayer may be a single layer having one or more resins that is then part of a multiple layer interlayer, such as a skin or core layer.

Structure (1):

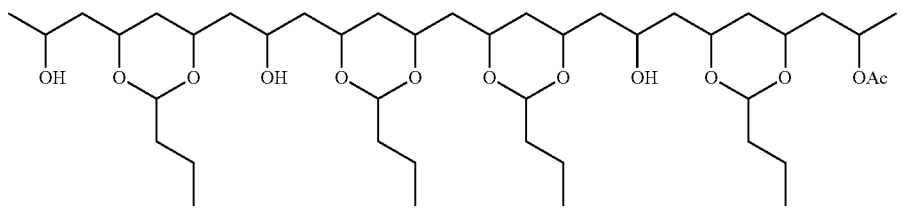

Structure (2):

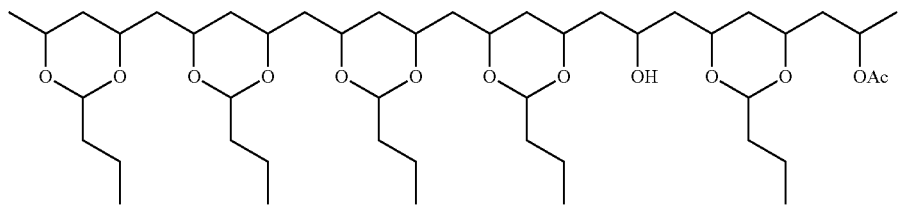

Structure (1), which has more vinyl alcohol segments (or higher residual vinyl alcohol content), represents the resin used in the skin in the example previously given, while Structure (2), having fewer vinyl alcohol segments (or lower residual vinyl alcohol content), represents the resin used for the core layer in the example. Structures (1) and (2) are only representative examples for illustration and discussion purposes and not to scale or necessarily accurate regarding the number of vinyl alcohol segments or the amount of residual hydroxyl content.

It has been discovered by the inventor that a small amount of a compatibilizer, when added to the mixture of resins and plasticizer(s) prior to extrusion, dramatically increases the compatibility between the different resins, such as the resins used in core and skin layers of multilayer polymer interlayers, and helps to reduce haze and other optical quality defects (such as reduced light transmission) in the final polymer composition or polymer interlayer.

Some terminology used throughout this application will be explained to provide a better understanding of the invention. The terms "polymer interlayer sheet," "interlayer," and "polymer melt sheet" as used herein, generally may designate a single-layer sheet or a multilayered interlayer. A "single-layer sheet," as the names implies, is a single (or monolithic) polymer layer extruded as one layer. A multi- In various embodiments, the polymer composition may be used in multilayered interlayers where the multilayered interlayer comprises at least two polymer layers (e.g., a single layer or multiple layers co-extruded) disposed in direct contact with each other, wherein each layer comprises a polymer resin, as detailed more fully below. In embodiments, at least one layer of the multilayer interlayer, such as a skin layer or the core layer, comprises two (or more) different resins, such as two PVB resins having different residual hydroxyl content levels. As used herein for multi-layer interlayers having at least three layers, "skin layer" generally refers to outer layers of the interlayer and "core layer" generally refers to the inner layer(s). Thus, one exemplary embodiment would be: skin layer//core layer//skin layer. It should be noted, however, further embodiments include interlayers having two layers, or more than three layers (e.g., 4, 5, 6, or up to 10 individual layers). Additionally, any multilayer interlayer utilized can be varied by manipulating the composition, thickness, or positioning of the layers and the like. For example, in one trilayer polymer interlayer sheet, the two outer or skin layers may comprise poly(vinyl butyral) ("PVB") resin with a plasticizer or mixture of plasticizers, while the inner or core layer may comprise different PVB resin or a different thermoplastic material with a plasticizer and/or mixture of plasticizers.

Thus, it is contemplated that the skin layers and the core layer(s) of the multilayered interlayer sheets may be comprised of the same thermoplastic material or different thermoplastic materials and the same or different plasticizer or plasticizers. Either or both layers may include additional additives as known in the art, as desired.

Although the embodiments described below refer to the polymer resin as being PVB (which includes its isomer, polyvinyl isobutyral), it would be understood by one of ordinary skill in the art that the polymer may be any polymer suitable for use in a multiple layer panel. Typical polymers include, but are not limited to, PVB, polyurethane, polyvinyl chloride, poly(ethylene-co-vinyl acetate), combinations of the foregoing, and the like. PVB, polyvinyl chloride, and polyurethane are particularly useful polymers generally for interlayers; PVB is particularly suitable when used in conjunction with the interlayers of this disclosure comprising a compatibilizer, such as an anhydride compatibilizer.

Prior to discussing the addition of the compatibilizer selected to produce the composition or the interlayer having improved optical quality, some common components found in a polymer composition and an interlayer, both generally and in compositions and interlayers of the present disclosure, and the formation thereof.

The PVB resin is produced by known acetalization processes by reacting polyvinyl alcohol ("PVOH") with butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc. (which is a wholly owned subsidiary of Eastman Chemical Company).

As used herein, residual hydroxyl content (calculated as % PVOH by weight) in PVB refers to the amount of hydroxyl groups remaining on the polymer chains after processing is complete. For example, PVB can be manufactured by hydrolyzing poly(vinyl acetate) to PVOH, and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished PVB resin, there typically will be residual acetate groups (as vinyl acetate groups) and residual hydroxyl groups (as vinyl alcohol groups) as side groups on the polymer chain. As used herein, residual hydroxyl content is measured on a weight percent basis per ASTM 1396.

In various embodiments, the PVB resin comprises about 8 to about 35 weight percent (wt. %) hydroxyl groups calculated as % PVOH, or about 9 to about 30 wt. %, about 10 to about 22 wt % hydroxyl groups calculated as % PVOH, although any level or combination of levels of residual hydroxyl groups is possible. The resin can also comprise less than 15 wt. % residual ester groups, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde acetal group, or a 2-ethyl hexanal acetal group, or a mix of any two of butyraldehyde acetal, isobutyraldehyde, and 2-ethyl hexanal acetal groups (see, for example, U.S. Pat. No. 5,137,954, the entire disclosure of which is incorporated herein by reference).

For a given type of plasticizer, the compatibility of the plasticizer in the PVB polymer is largely determined by the hydroxyl content of the polymer. PVB with greater residual hydroxyl content is typically correlated with reduced plasticizer compatibility or capacity, i.e., less plasticizer could be incorporated. Conversely, PVB with a lower residual hydroxyl content typically will result in increased plasticizer compatibility or capacity, i.e., more plasticizer could be incorporated. For some plasticizer types, such correlation might be reversed. Generally, this correlation between the residual hydroxyl content of a polymer and plasticizer compatibility/capacity will allow for addition of the proper amount of plasticizer to the polymer resin and more importantly, the ability to stably maintain differences in plasticizer content between multiple interlayers. The PVB resin (or resins) of the present disclosure typically has a molecular weight of greater than 50,000 Daltons, or less than 500,000 Daltons, or about 70,000 to about 500,000 Daltons, or about 100,000 to about 425,000 Daltons, as measured by size exclusion chromatography using low angle laser light scattering. As used herein, the term "molecular weight" means the weight average molecular weight.

Various adhesion control agents ("ACAs") can be used in the interlayers of the present disclosure to control the adhesion of the sheet to glass. In various embodiments of interlayers of the present disclosure, the interlayer can comprise about 0.003 to about 0.45 parts ACAs per 100 parts resin; about 0.01 to about 0.40 parts ACAs per 100 parts resin; and about 0.01 to about 0.10 parts ACAs per 100 parts resin. Such ACAs, include, but are not limited to, the ACAs disclosed in U.S. Pat. No. 5,728,472 (the entire disclosure of which is incorporated herein by reference), residual sodium acetate, potassium acetate, magnesium bis(2-ethyl butyrate), and/or magnesium bis(2-ethylhexanoate).

Other additives (in addition to the compatibilizer disclosed herein) may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

The interlayer can comprise 0 to about 100, 0 to about 80, about 0 to 45, about 10 to about 75, about 15 to about 60, about 25 to about 50, about 15 to about 50, about 10 to about 40, about 15 to about 40, about 25 to about 38, about 29 to about 32, and about 30 phr (parts per hundred parts resin) plasticizer or a mix of plasticizers. Of course, other quantities can be used as is appropriate for the particular application and the desired properties. In various embodiments of interlayers of the present disclosure, the interlayer will comprise greater than 5 phr, about 5 to about 100 phr, about 10 to about 80 phr, about 30 to about 60 phr, or less than 100 phr, or less than 80 phr total plasticizer. While the total plasticizer content is indicated above, the plasticizer content in the individual layers, such as the skin layer(s) or core layer(s) can be different from the total plasticizer content. In addition, the individual layers, such as the skin layer(s) and core layer(s), can have different plasticizer types and plasticizer contents, in the ranges previously discussed, as each respective layer's plasticizer content at the equilibrium state is determined by the layer's respective residual hydroxyl contents, as disclosed in U.S. Pat. No. 7,510,771 (the entire disclosure of which is incorporated herein by reference).

In some embodiments, examples of the plasticizer include esters of a polybasic acid or a polyhydric alcohol and phosphates, among others. Suitable plasticizers include, for example, triethylene glycol di-(2-ethylhexanoate) ("3GEH"), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, di(butoxyethyl) adipate, bis(2-(2-butoxyethoxy)ethyl) adipate, and mixtures thereof. In some embodiments, the plasticizer is 3GEH.

In some embodiments, the plasticizer may be a high refractive index plasticizer. Examples of high refractive index plasticizers include, but are not limited to, esters of a polybasic acid or a polyhydric alcohol, polyadipates, epoxides, phthalates, terephthalates, benzoates, toluoates, mellates and other specialty plasticizers, among others. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluoate, triethylene glycol di-o-toluoate, dipropylene glycol di-o-toluoate, 1,2-octyl dibenzoate, tri-2-ethylhexyl trimellitate, di-2-ethylhexyl terephthalate, bis-phenol A bis (2-ethylhexaonate), and mixtures thereof. Examples of particularly suitable high refractive index plasticizers are dipropylene glycol dibenzoates, tripropylene glycol dibenzoates, and 2,2,4-trimethyl-1,3-pentanediol dibenzoate.

Plasticizers work by embedding themselves between chains of polymers, spacing them apart (increasing the "free volume") and thus significantly lowering the glass transition temperature ($T_g$) of the polymer resin (typically by 0.5 to 4° C./phr), making the material softer. In this regard, the amount of plasticizer in the interlayer can be adjusted to affect the glass transition temperature ($T_g$). The glass transition temperature ($T_g$) is the temperature that marks the transition from the glassy state of the polymer to the rubbery state. In general, higher amounts of plasticizer loading will result in lower $T_g$. Conventional interlayers generally have a $T_g$ in the range of about 0° C. for acoustic (noise reducing) interlayer to about 45° C. for hurricane and aircraft interlayer applications. A particularly suitable $T_g$ for certain embodiments is in the range of about 28° C. to about 35° C. for the standard or most common monolithic interlayer applications, and about −5° C. to about 5° C. for the core layer(s) in the trilayer acoustic interlayer applications.

An interlayer's glass transition temperature is also correlated with the stiffness of the interlayer, and in general, the higher the glass transition temperature, the stiffer the interlayer. Generally, an interlayer with a glass transition temperature of 30° C. or higher increases windshield strength and torsional rigidity. A soft interlayer (generally characterized by an interlayer with a glass transition temperature of lower than 30° C.), on the other hand, contributes to the sound dampening effect (i.e., the acoustic characteristics). In some embodiments, the multilayered interlayers can be produced by combining these two advantageous properties (i.e., strength and acoustic) by utilizing harder or stiffer skin layers laminated with a softer core layer (e.g., stiff//soft//stiff) and softer skin layers laminated with a stiffer core layer (e.g., soft//stiff//soft). The skin layer in the multilayered interlayer can have glass transition temperatures of about 25° C. to about 40° C., about 20° C. to about 35° C., about 25° C. to 35° C., about 25° C. or greater, about 30° C. or greater, and about 35° C. or greater, and core layer(s) of about 39° C. or greater, about 35° C. or greater, about 35° C. or less, about 10° C. or less, and about 4° C. or less. For example, the following are some exemplary multilayered configurations:

$(T_g>25°\ C.)//(T_g<10°\ C.)//(T_g>25°\ C.);$ $(25°\ C.<T_g<40°\ C.)//(T_g<10°\ C.)//(25°\ C.<T_g<40°\ C.);$ $(T_g<35°\ C.)//(T_g>35°\ C.)//(T_g<35°\ C.);$ and $(20°\ C.<T_g<35°\ C.)//(T_g>35°\ C.)//(20°\ C.<T_g<35°\ C.).$ These configurations are merely exemplary and are in no way meant to be limiting to the types of multilayered configurations. The interlayer of the present invention may be a single or monolithic interlayer sheet, or an interlayer sheet having any other number of layers, as desired.

Additionally, it is contemplated that polymer interlayer sheets as described herein may be produced by any suitable process known to one of ordinary skill in the art of producing polymer interlayer sheets that are capable of being used in a multiple layer panel (such as a glass laminate or a photovoltaic module or solar panel). For example, it is contemplated that the polymer interlayer sheets may be formed through solution casting, compression molding, injection molding, melt extrusion, melt blowing or any other procedures for the production and manufacturing of a polymer interlayer sheet known to those of ordinary skill in the art. Further, in embodiments where multiple polymer interlayers are utilized, it is contemplated that these multiple polymer interlayers may be formed through co-extrusion, blown film, dip coating, solution coating, blade, paddle, air-knife, printing, powder coating, spray coating or other processes known to those of ordinary skill in the art. While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes. The final multiple layer glass panel laminate are formed using processes known in the art.

Generally, in its most basic sense, extrusion is a process used to create objects of a fixed cross-sectional profile. This is accomplished by pushing or drawing a material through a die of the desired cross-section for the end product.

Generally, in the extrusion process, thermoplastic resin and plasticizers, including any of those resins and plasticizers described above, as well as any recycled material and the compatibilizer, are pre-mixed and fed into an extruder device. Additives such as ACAs, colorants and UV inhibitors (in liquid, powder, or pellet form) are often used and can be mixed into the thermoplastic resin or plasticizer prior to arriving in the extruder device. These additives are incorporated into the thermoplastic polymer resin, and by extension the resultant polymer interlayer sheet, to enhance certain properties of the polymer interlayer sheet and its performance in the final multiple layer glass panel product (or photovoltaic module).

The compatibilizer may be any suitable compatibilizer known in the art that increases the compatibility of the PVB resins and allows the different resin and/or plasticizer types to be mixed together to produce a product having lower haze while also maintaining other desirable physical and mechanical properties. In other words, any compatibilizer may be used, as long as it functions as a compatibilizer between the two or more types of resins having different residual vinyl alcohol contents and/or two or more types of plasticizers. The compatibilizer should be able to modify the resin via reactions or physical interactions so that the compatibility between resins (or interlayer sheets containing the resins) having different residual vinyl alcohol contents and/or different plasticizers can be improved.

Examples of compatibilizers include, but are not limited to, anhydrides (such as hexahydrophthalic anhydride, hexahydro-4-methylphthalic anhydride, phthalic anhydride, maleic anhydride, succinic anhydride, glutaric anhydride, citraconic anhydride, 3,4,5,6-tetrahydrophthalic anhydride, and cyclohexanedicarboxylic anhydride), salicyclic acid, boric acid, glycidyl neodecanoate, non-reactive compatibilizers (such as ethoxylated nonylphenol), epoxies, di-isocyanates, and combinations of the foregoing compatibilizers. The compatibilizer may be liquid or solid, and may be mixed into the plasticizer prior to mixing with the resin and any recycle material, or added in any other manner desired.

In some embodiments, the compatibilizer may be an anhydride compatibilizer or a mixture of two or more anhydride compatibilizers. Examples of anhydride compatibilizers include, but are not limited to, those having Structure (3):

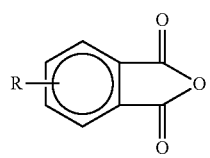

(3)

Structure (4):

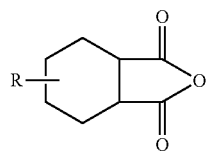

(4)

Structure (5):

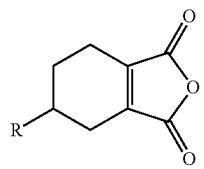

(5)

or Structure (6):

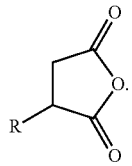

(6)

In Structures (3), (4), (5) and (6), R may be any desired substituent and can be mono-, di-tri-, tetra-substituted or the like. For example, R may be hydrogen, a saturated or unsaturated carbon chain of from 1 to 16 carbon atoms, or from 1 to 10 carbon atoms (such as $CH_3$, $CH_2CH_3$), or any other substitution group as desired.

In some embodiments, the compatibilizer may be the mixture of two or more anhydrides, such as a mixture of anhydrides of Structure (3) and Structure (4), or a mixture of anhydrides of Structure (3) and Structure (5), or a mixture of anhydrides of Structure (3) and Structure (6), or a mixture of anhydrides of Structure (4) and Structure (5), or a mixture of anhydrides of Structure (4) and Structure (6), or a mixture of anhydrides of Structure (3), Structure (4) and Structure (5), or a mixture of anhydrides of Structure (4), Structure (5) and Structure (6), or a mixture of anhydrides of Structure (3), Structure (4), Structure (5) and Structure (6), or a mixture of two or more anhydrides of Structure (3), or a mixture of two or more anhydrides of Structure (4), or a mixture of two or more anhydrides of Structure (5), or a mixture of two or more anhydrides of Structure (6), or any other combination of anhydrides, depending on the desired properties.

In an embodiment, the anhydride compatibilizer (or at least one compatibilizer) may be hexahydro-4-methylphthalic anhydride having the Structure (7):

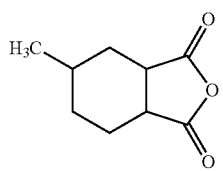

(7)

or a phthalic anhydride having the Structure (8):

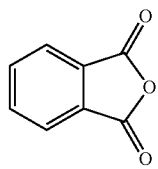

(8)

or 3,4,5,6-tetrahydrophthalic anhydride having the Structure (9):

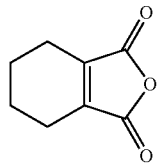

or 2-octen-1-ylsuccinic anhydride having the Structure (10):

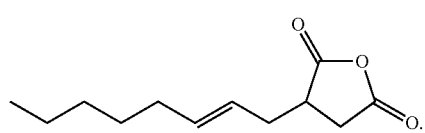

In an embodiment, the anhydride compatibilizer may be a hexahydrophthalic anhydride.

In an embodiment, the anhydride compatibilizer may be a mixture of two or more anhydrides, such as a mixture of two or more of hexahydro-4-methylphthalic anhydride, hexahydrophthalic anhydride, phthalic anhydride, 3,4,5,6-tetrahydrophthalic anhydride, and 2-octen-1-ylsuccinic anhydride. For example, the compatibilizer may be a mixture of hexahydro-4-methylphthalic anhydride and hexahydrophthalic anhydride, or a mixture of phthalic anhydride and 3,4,5,6-tetrahydrophthalic anhydride, or a mixture of 2-octen-1-ylsuccinic anhydride and hexahydrophthalic anhydride, or a mixture of hexahydro-4-methylphthalic anhydride and phthalic anhydride, or a mixture of hexahydro-4-methylphthalic anhydride and 3,4,5,6-tetrahydrophthalic anhydride, or any combination of two or more of anhydrides as desired. In an embodiment, the compatibilizer comprises a mixture of hexahydrophthalic anhydride and hexahydro-4-methylphthalic anhydride.

The compatibilizer, which in some embodiments may be an anhydride compatibilizer, is generally added in amounts of from about 0.01 to about 10 wt. %, or from about 0.05 to about 5 wt. %, or at least about 0.01 wt. %, or at least about 0.02 wt. %, or at least about 0.03 wt. %, or at least about 0.04 wt. %, or at least about 0.05 wt. %, or less than or equal to about 10 wt. %, or less than or equal to about 9 wt. %, or less than or equal to about 8 wt. %, or less than or equal to about 7 wt. %, or less than or equal to about 6 wt. %, or less than or equal to about 5 wt. %. The compatibilizer should be selected such that most of the compatibilizer is reacted onto the PVB polymer, leaving little or no unreacted compatibilizer in the polymer interlayer.

In the extruder (or other mixing) device, the thermoplastic raw material, recycled material and plasticizers, and any other additives described above, are further mixed and melted, resulting in a melt that is generally uniform in temperature and composition. Once the melt reaches the end of the extruder device, the melt is propelled into the extruder die. The extruder die is the component of the thermoplastic extrusion process which gives the final polymer interlayer sheet product its profile. Generally, the die is designed such that the melt evenly flows from a cylindrical profile out of the die and into the product's end profile shape. A plurality of shapes can be imparted to the end polymer interlayer sheet by the die so long as a continuous profile is present. In some embodiments, the compatibilizer can be added into recycled material (e.g., trilayer acoustic interlayer or other recycled material, such as that comprising multiple different resins and/or plasticizers) and melt mixed together. The melt can be extruded into pellets to produce compatibilized material containing compatibilizer, which can be used later in producing polymer interlayer. The compatibilized material can be used to produce a monolithic interlayer, or a multiple layer interlayer in which at least one of the layers contains compatibilized material.

Notably, for the purposes of this application, the polymer interlayer at the state after the extrusion die forms the melt into a continuous profile will be referred to as a "polymer melt sheet." At this stage in the process, the extrusion die has imparted a particular profile shape to the thermoplastic resin, thus creating the polymer melt sheet. The polymer melt sheet is highly viscous throughout and in a generally molten state. In the polymer melt sheet, the melt has not yet been cooled to a temperature at which the sheet generally completely "sets." Thus, after the polymer melt sheet leaves the extrusion die, generally the next step in presently employed thermoplastic extrusion processes is to cool the polymer melt sheet with a cooling device. Cooling devices utilized in the previously employed processes include, but are not limited to, spray jets, fans, cooling baths, and cooling rollers. The cooling step functions to set the polymer melt sheet into a polymer interlayer sheet of a generally uniform non-molten cooled temperature. In contrast to the polymer melt sheet, this polymer interlayer sheet is not in a molten state and is not highly viscous. Rather, it is the set final-form cooled polymer interlayer sheet product. For the purposes of this application, this set and cooled polymer interlayer will be referred to as the "polymer interlayer sheet."

In some embodiments of the extrusion process, a co-extrusion process may be utilized. Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

Generally, the thickness, or gauge, of the polymer interlayer sheet will be in a range from about 15 mils to 100 mils (about 0.38 mm to about 2.54 mm), about 15 mils to 60 mils (about 0.38 mm to about 1.52 mm), about 20 mils to about 50 mils (about 0.51 to 1.27 mm), and about 15 mils to about 35 mils (about 0.38 to about 0.89 mm). In various embodiments, each of the layers, such as the skin and core layers, of the multilayer interlayer may have a thickness of about 1 mil to 99 mils (about 0.025 to 2.51 mm), about 1 mil to 59 mils (about 0.025 to 1.50 mm), 1 mil to about 29 mils (about 0.025 to 0.74 mm), or about 2 mils to about 28 mils (about 0.05 to 0.71 mm).

As noted above, the interlayers of the present disclosure may be used as a single-layer sheet or a multilayered sheet. In various embodiments, the interlayers of the present disclosure (either as a single-layer sheet or as a multilayered sheet) can be incorporated into a multiple layer panel.

As used herein, a multiple layer panel can comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass)//(polymer interlayer sheet)//(polymer film), where the polymer interlayer sheet can comprise multiple interlayers, as noted above. The polymer film supplies a smooth, thin, rigid substrate that affords better optical character than that usually obtained with a polymer interlayer sheet alone and functions as a performance enhancing layer. Polymer films differ from polymer interlayer sheets, as used herein, because polymer films do not themselves provide the necessary penetration resistance and glass retention properties, but rather provide performance improvements, such as infrared absorption characteristics. Poly(ethylene terephthalate) ("PET") is the most commonly used polymer film. Generally, as used herein, a polymer film is thinner than a polymer sheet, such as from about 0.001 to 0.2 mm thick.

Further, the multiple layer panel can be what is commonly known in the art as a solar panel, with the panel further comprising a photovoltaic cell, as that term is understood by one of ordinary skill in the art, encapsulated by the polymer interlayer(s). In such instances, the interlayer is often laminated over the photovoltaic cell, with a construct such as: (glass)//(polymer interlayer)//(photovoltaic cell)//(polymer interlayer)//(glass or polymer film).

The interlayers of the present disclosure will most commonly be utilized in multiple layer panels comprising two substrates, preferably a pair of glass sheets (or other rigid materials, such as polycarbonate or acrylic, known in the art), with the interlayers disposed between the two substrates. An example of such a construct would be: (glass)//(polymer interlayer sheet)//(glass), where the polymer interlayer sheet can comprise a single layer interlayer or multilayered interlayers, as noted above. These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 50° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and at pressures between 150 psig and 200 psig for about 30 to 90 minutes.

Other means for use in de-airing of the interlayer-glass interfaces (steps 2-5) known in the art and that are commercially practiced include vacuum bag and vacuum ring processes in which a vacuum is utilized to remove the air.

Clarity is one measure of optical quality of a laminate. Clarity is determined by measuring the haze value or percent haze (% haze) and/or the percent transmittance (% T). Haze is a percentage of transmitted light that is scattered so that its direction deviates more than a specified angle from the direction of the incident beam. Haze may be measured using a haze meter or a spectrophotometer, such as HunterLab UltraScan XE instrument, or other haze meter known to one of skill in the art, and in accordance with ASTM D1003-Procedure B using Illuminant C, at an observer angle of 2 degrees. Percent transmittance (% T) or Transparency, is the percentage of the total incident light transmitted through the specimen, and is determined according to ASTM D1003 as well. The improved polymer compositions and interlayers comprising the compositions of the present disclosure have a percent haze of less than about 5%, or less than about 4.5%, or less than about 4%, or less than about 3.5%, or less than about 3%, or less than about 2.5%, or less than about 2%, or less than about 1.5%, or less than about 1%, or less than about 0.5%. The improved polymer compositions and interlayers comprising the compositions of the present disclosure have a % T of greater than 70%, or greater than 75%, or greater than 80%, if the interlayer is a clear interlayer. Interlayers having dyes or pigments may have a % T that is lower, as desired.

The glass transition temperature also is used to describe the polymer interlayers of the present disclosure. The glass transition temperature ($T_g$) was determined by dynamical mechanical thermal analysis (DMTA). The DMTA measures the storage (elastic) modulus (G') in Pascals, loss (viscous) modulus (G") in Pascals, loss (damping) factor (LF) [tan (delta)] of the specimen as a function of temperature at a given frequency and temperature sweep rate. A frequency of 1 Hz and temperature sweep rate of 3° C./min were used herein. The $T_g$ is then determined by the position of the loss factor peak on the temperature scale in ° C.

The invention also includes Embodiments 1 to 19, as set forth below.

Embodiment 1 is a polymer composition comprising: a first poly(vinyl butyral) resin having a first residual hydroxyl content; a second poly(vinyl butyral) resin having a second residual hydroxyl content; a plasticizer; and at least one compatibilizer; wherein the difference between the first and second residual hydroxyl contents is at least 2 wt. %, and wherein the polymer composition has a percent haze of less than 5% (as measured in accordance with ASTM D1003-Procedure B using Illuminant C).

Embodiment 2 is a polymer composition including the features of embodiment 1, where the polymer composition comprises from about 0.01 wt. % to about 10 wt. % compatibilizer.

Embodiment 3 is a polymer composition including the features of any of embodiments 1 to 2, wherein the compatibilizer is an anhydride compatibilizer.

Embodiment 4 is a polymer composition comprising: a first poly(vinyl butyral) resin having a first residual hydroxyl content; a second poly(vinyl butyral) resin having a second residual hydroxyl content; a plasticizer; and from 0.01 to 10 wt. % of at least one anhydride compatibilizer; wherein the difference between the first and second residual hydroxyl contents is at least 2 wt. %, and wherein the polymer composition has a percent haze of less than 5% (as measured in accordance with ASTM D1003-Procedure B using Illuminant C).

Embodiment 5 is a polymer composition including the features of any of embodiments 1 to 4, wherein the compatibilizer comprises at least one anhydride having Structure (3), Structure (4), Structure (5) or Structure (6):

Structure (3):

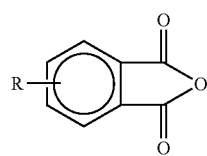

(3)

-continued

Structure (4):

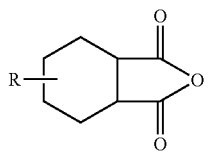

(4)

Structure (5):

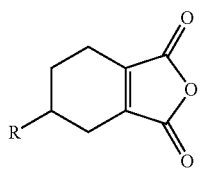

(5)

Structure (6):

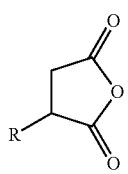

(6)

wherein R may be hydrogen or a saturated or unsaturated carbon chain of from 1 to 16 carbon atoms.

Embodiment 6 is a polymer composition including the features of any of embodiments 1 to 5, wherein the compatibilizer comprises at least two anhydrides.

Embodiment 7 is a polymer composition including the features of any of embodiments 1 to 6, wherein the compatibilizer is at least one of hexahydro-4-methylphthalic anhydride, hexahydrophthalic anhydride, phthalic anhydride, 3,4,5,6-tetrahydrophthalic anhydride, or 2-octen-1-ylsuccinic anhydride.

Embodiment 8 is a polymer composition including the features of any of embodiments 1 to 7, wherein the compatibilizer comprises a mixture of hexahydrophthalic anhydride and hexahydro-4-methylphthalic anhydride.

Embodiment 9 is a polymer composition including the features of any of embodiments 1 to 8, where the polymer composition comprises from about 0.05 wt. % to about 5 wt. % compatibilizer.

Embodiment 10 is polymer interlayer including the features of any of embodiments 1 to 9.

Embodiment 11 is a multiple layer polymer interlayer comprising: a first layer comprising a first poly(vinyl butyral) resin having a first residual hydroxyl content and a plasticizer; a second layer comprising a second poly(vinyl butyral) resin having a second residual hydroxyl content and a third poly(vinyl butyral) resin having a third residual hydroxyl content, a plasticizer, and at least one compatibilizer; wherein the difference between the second and third residual hydroxyl contents is at least 2 wt. %, and wherein the polymer interlayer has a percent haze of less than 5% (as measured in accordance with ASTM D1003-Procedure B using Illuminant C).

Embodiment 12 is a polymer interlayer including the features of embodiment 1, where the polymer interlayer comprises from about 0.01 wt. % to about 10 wt. % compatibilizer.

Embodiment 13 is a polymer interlayer including the features of any of embodiments 11 to 12, wherein the compatibilizer is an anhydride compatibilizer.

Embodiment 14 is a polymer interlayer including the features of any of embodiments 11 to 13, wherein the compatibilizer comprises at least one anhydride having Structure (3), Structure (4), Structure (5) or Structure (6):

Structure (3):

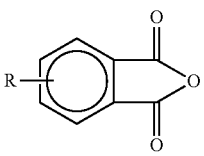

(3)

Structure (4):

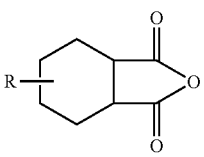

(4)

Structure (5):

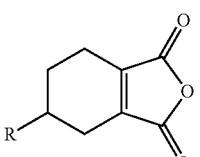

(5)

Structure (6):

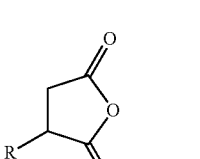

(6)

wherein R may be hydrogen or a saturated or unsaturated carbon chain of from 1 to 16 carbon atoms.

Embodiment 15 is a polymer interlayer including the features of any of embodiments 11 to 14, wherein the compatibilizer comprises at least two anhydrides.

Embodiment 16 is a polymer composition including the features of any of embodiments 11 to 15, wherein the compatibilizer is at least one of hexahydro-4-methylphthalic anhydride, hexahydrophthalic anhydride, phthalic anhydride, 3,4,5,6-tetrahydrophthalic anhydride, or 2-octen-1-ylsuccinic anhydride.

Embodiment 17 is a polymer interlayer including the features of any of embodiments 11 to 16, wherein the compatibilizer comprises a mixture of hexahydrophthalic anhydride and hexahydro-4-methylphthalic anhydride.

Embodiment 18 is a polymer composition including the features of any of embodiments 11 to 17, where the polymer composition comprises from about 0.05 wt. % to about 5 wt. % compatibilizer.

Embodiment 19 is a multiple layer glass panel including the polymer interlayer of any of embodiments 11 to 18.

EXAMPLES

The improvements (or reduction) in the level of haze in a polymer interlayer when combining resins having different residual vinyl alcohol content in the presence of a compatibilizer, such as an anhydride compatibilizer, can be readily appreciated by a comparison of compositions using multiple resins and a compatibilizer to samples having multiple resins without the addition of a compatibilizer, as discussed below.

A 'virgin' composition ("virgin PVB") was formed by mixing 100 parts poly(vinyl butyral) resin having 18 to 19 weight percent residual hydroxyl groups and 2 weight percent of a residual vinyl acetate, 38 parts of plasticizer, and other common additives used in interlayers. This virgin composition was further mixed with various amounts of different compatibilized or un-compatibilized recycle material and melt processed into polymer interlayers.

The compatibilized recycle PVB materials were produced by mixing and melt-processing different mixtures of recycle material with various amounts of anhydride compatibilizers into pellets or flakes (using a device such as a twin-screw extruder, or a single screw extruder, or a Banbury-type mixer). The recycle PVB ("recycle PVB") material used was trilayer acoustic PVB material having skin layers comprising plasticized poly(vinyl butyral) resin layers having about 18 to 19 weight percent residual hydroxyl groups and a vinyl acetate residue of 2% and having a total thickness of 28 mil, and a core layer comprising a plasticized poly(vinyl butyral) resin layer having about 10 to 11 weight percent residual hydroxyl groups and a vinyl acetate residue of 2% and having thickness of 4.5 mil.

The compatibilized recycle materials can also be produced by mixing virgin composition, comprising 100 parts poly(vinyl butyral) resin having 18 to 19 weight percent residual hydroxyl groups and 2 weight percent of a residual vinyl acetate, 38 parts of plasticizer, other common additives used in interlayers, and recycle PVB material, and various amounts of anhydride compatibilizers, and then melt extruding the mixtures into pellets or flakes (using a device such as a twin-screw extruder, or a single screw extruder, or a Banbury-type mixer). The results are as shown in Table 1 to Table 4 below for each of the Examples.

Example 1

Control samples containing various levels (3, 10, 30, 40 and 100%) of recycle PVB with the remainder virgin composition (virgin PVB) (except for Sample A1 which was 100% recycle PVB) were produced. No compatibilizer was added. The materials were melt mixed in a Brabender™ mixer and melt compressed into sheet samples using a steam-heated presser to form a sheet having a thickness of about 0.76 mm (30 mil). The sheets were then laminated between two pieces of clear glass (90 mil thickness) and tested. Percent haze was measured on the laminate samples, and the results are shown in Table 1 below.

TABLE 1

| Sample | Wt. % of Recycle PVB | % Haze (30 mil) |
|---|---|---|
| A1 | 100 | 19.30 |
| C1 | 40 | 3.45 |
| A7 | 30 | 1.60 |
| A6 | 10 | 1.15 |
| A5 | 3 | 0.97 |

Table 1 shows that even at low levels (3 to 10 wt. %) of addition of the recycle PVB, the resulting percent haze of the laminate may be unacceptable. For example, Sample A5 has a percent haze level of about 1%, but only 3% recycle PVB was added. For Samples A6 and A7 (10 and 30% recycle PVB respectively), haze level increased to more than 1%. At levels of 40 and 100%, the haze significantly increased. The amount of haze generally acceptable to many industrial applications, such as automotive and architecture applications, is below about 1%. As shown in Table 1, as the amount of recycle PVB in the composition increases, the percent haze also increases, as shown by Samples A1, C1 and A5 to A7.

Example 2

In Example 2, hexahydro-4-methylphthalic anhydride (HHMPA) in varying amounts (from 2.13 wt. % to 6.76 wt. %) was added to the mixtures comprising 40 to 100 wt. % recycle PVB and 60% to 0% virgin PVB. The materials were melt mixed in a Brabender mixer and melt compressed into sheet samples using a steam-heated presser to form a sheet having a thickness of about 0.76 mm (30 mil). The sheets were then laminated between two pieces of clear glass and tested. Control samples having no compatibilizer (A1 and C1) from Table 1 above are shown for comparison. Samples A1 to A4 were samples of 100% recycle PVB; Samples B1 and B2 comprised 50% recycle PVB and 50% virgin PVB; and Samples C1 and C2 comprised 40% recycle PVB and 60% virgin PVB. Percent haze was measured on all laminate samples, and the data is shown in Table 2 below.

TABLE 2

| Sample | Wt. % of Recycle PVB | Wt. % of Compatibilizer - HHMPA | % Haze (30 mil) |
|---|---|---|---|
| A1 | 100 | 0 | 19.30 |
| A2 | 100 | 2.13 | 16.25 |
| A3 | 100 | 4.17 | 14.05 |
| A4 | 100 | 6.10 | 8.95 |
| B1 | 50 | 4.17 | 5.60 |
| B2 | 50 | 6.76 | 2.90 |
| C1 | 40 | 0 | 3.45 |
| C2 | 40 | 5.70 | 1.40 |

Table 2 demonstrates that the percent haze is at the highest level for the control samples having no compatibilizer, and as compatibilizer is added to the blend of recycle and virgin PVB, the haze level decreases. Comparing Sample A1 to Samples A2, A3 and A4, as increasing amounts of anhydride compatibilizer (from 2.1 to 6.1 wt. % respectively) were added to the blends, the haze, which was 19.30% in Sample A1 (with no compatibilizer), dropped as the amount of compatibilizer increased. With the addition of 6.10 wt. % of compatibilizer, percent haze was significantly (less than half) reduced from 19.30% to 8.95% (Sample A4). Comparing Samples C1 and C2, adding 5.7 wt. % anhydride compatibilizer to the samples with 40% recycle PVB reduced the haze by more than 50%, from 3.45% (Sample C1) to 1.40% (Sample C2). Samples B1 and B2 additionally confirm that increasing the amount of anhydride compatibilizer reduces the haze levels.

Example 3

The compatibilized material made in Sample A3 (100% recycle PVB with 4.17% HHMPA compatibilizer) or Sample A4 (100% recycle PVB with 6.10% HHMPA compatibilizer) was added at varying amounts from 10 to 30 wt. % into virgin PVB and melt mixed and melt compressed into sheet samples and then laminated as described above. Percent haze was measured on the laminate samples, and the results are shown in Table 3 below.

TABLE 3

| Sample | Wt. % of Compatibilized Recycle PVB of Sample A3 | Wt. % of Compatibilized Recycle PVB of Sample A4 | % Haze (30 mil) |
|---|---|---|---|
| D1 | 10 | | 0.45 |
| D2 | 20 | | 0.65 |
| D3 | 30 | | 0.95 |
| E1 | | 10 | 0.40 |
| E2 | | 20 | 0.50 |
| E3 | | 30 | 0.65 |

Table 3 shows that when compatibilized recycle PVB is added into virgin PVB at levels of up to 30 wt. % and melt mixed and melt compressed into sheet samples, the resulting percent haze is still lower than the haze of Sample A5, which is the sample containing only 3% recycle PVB without a compatibilizer. Therefore, much higher levels of recycle PVB, such as up to at least 30% recycle PVB, can be added into the virgin composition and used to produce a quality interlayer having acceptably low haze levels. This is in contrast to samples without a compatibilizer, where only about 3% of the recycle PVB could be added without causing haze or clarity problems.

Comparing Sample D3 to Sample A7, both samples had 30 wt. % recycle PVB added, but the recycle PVB added to Sample A7 was not compatibilized. As shown in Table 3, the percent haze of Sample D3 was much less than that of Sample A7 (or, stated differently, the percent haze of Sample A7 is over 50% higher at 1.60 versus 0.95 for Sample D3). Comparing Sample D1 to Sample A6 shows a similar result, where 10 wt. % of recycle PVB was added. In the compatibilized blend (Sample D1), the resultant haze was 0.45, compared to 1.15 (Sample A6) where no compatibilizer was added. Comparing Sample E3 to Sample A7, both samples had 30 wt. % recycle PVB, but the recycle PVB in Sample A7 was not compatibilized, and therefore the resulting percent haze level was much higher than that in Sample D3 (1.60% versus 0.65%, or over 100% higher), which contained compatibilized recycle PVB. Comparing Sample E1 to Sample A6 shows a similar result, where each sample contained 10 wt. % of recycle PVB. In the compatibilized blend of Sample E1, the resultant haze was 0.40%, compared to a haze level of 1.15% where no compatibilizer was added. This can also be demonstrated by comparing Sample A5 to Sample E3, where even at an addition level of 30 wt. % of the compatibilized recycle PVB, the resulting percent haze of Sample E5 is still lower than the haze of Sample A5, which only had 3 wt. % recycle PVB (0.65% versus 0.97%).

Further, a comparison of the results in Table 3 shows that for samples having a higher level of anhydride compatibilizer (6.10 wt. % versus 4.17 wt. %), the resultant percent haze for samples having the same level of recycle PVB is lower, particularly at higher levels of recycle PVB material (compare Sample D3 with Sample E3).

Example 4

Samples were also prepared using a different anhydride compatibilizer, phthalic anhydride (PA), at different levels of compatibilizer. Amounts of compatibilizer and resulting haze are shown in Table 4. All mixtures in Table 4 contain 40% recycle PVB and 60% virgin PVB as well as the amount of phthalic anhydride shown in the table. The samples were melt mixed at different temperatures as indicated in Table 4 for 7 minutes and then melt compressed into sheet samples, and then laminated and tested for % Haze (as described above). Results are shown in Table 4.

TABLE 4

| Sample | Wt % of Compatibilizer PA | Mixing Temperatures (° C.) | % Haze |
|---|---|---|---|
| F1 | 0 | 170 | 3.15 |
| G1 | 1 | 170 | 2.55 |
| H1 | 2 | 170 | 2.60 |
| I1 | 4 | 170 | 2.10 |
| F2 | 0 | 190 | 4.70 |
| G2 | 1 | 190 | 2.40 |
| H2 | 2 | 190 | 2.30 |
| I2 | 4 | 190 | 2.25 |

Table 4 shows that a different compatibilizer, phthalic anhydride, can also be used in blends containing recycle PVB to effectively reduce the percent haze level and improve the clarity of the resulting interlayer. Table 4 also shows that although percent haze is effectively reduced when phthalic anhydride compatibilizer is used compared to samples with no compatibilizer (Samples F1 and F2), the mixing temperature (170° C. vs. 190° C.) had very little effect on the resulting percent haze.

In conclusion, the Examples show that the compositions and interlayers comprising blends of multiple resins having differing residual vinyl alcohol levels and a compatibilizer, such as an anhydride compatibilizer, as described herein, have advantages over interlayers comprising blends of similar resins without the anhydride compatibilizer, as previously utilized in the art. In general, use of a compatibilizer, such as an anhydride compatibilizer, results in significantly increased compatibility of the resins, which results in a polymer composition (and an interlayer comprising the composition) having good clarity (i.e., lower percent haze), good color, reduced transmission loss, and therefore improved optical quality interlayers. Use of an anhydride compatibilizer results in significantly increased recyclability of different PVB materials or resins having different properties, such as different residual hydroxyl content. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as anhydrides, can also be applied to species within the genus or members of the category, such as hexahydro-4-methylphthalic anhydride or phthalic anhydride, unless otherwise noted.

The invention claimed is:

1. A multiple layer polymer interlayer comprising:
a first layer comprising a first poly(vinyl butyral) resin having a first residual hydroxyl content and a plasticizer;
a second layer comprising a second poly(vinyl butyral) resin having a second residual hydroxyl content and a third poly(vinyl butyral) resin having a third residual hydroxyl content, a plasticizer, and at least one anhydride compatibilizer;
wherein the difference between the second and third residual hydroxyl contents is at least 2 wt. %, and
wherein the polymer interlayer has a percent haze of less than 5% (as measured in accordance with ASTM D1003-Procedure B using Illuminant C).

2. The polymer interlayer of claim 1, comprising from about 0.01 wt. % to about 10 wt. % compatibilizer.

3. The polymer interlayer of claim 1, wherein the compatibilizer comprises at least one anhydride having Structure (3), Structure (4), Structure (5) or Structure (6):

Structure (3):

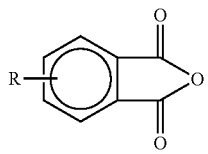

(3)

Structure (4):

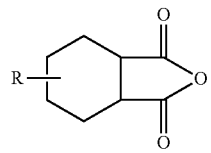

(4)

Structure (5):

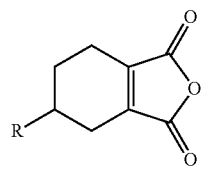

(5)

Structure (6):

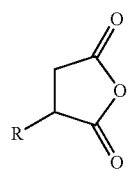

(6)

wherein R may be hydrogen or a saturated or unsaturated carbon chain of from 1 to 16 carbon atoms.

4. The polymer interlayer of claim 1, wherein the compatibilizer is at least one of hexahydro-4-methylphthalic anhydride, hexahydrophthalic anhydride, phthalic anhydride, 3,4,5,6-tetrahydrophthalic anhydride, or 2-octen-1-ylsuccinic anhydride.

5. The polymer interlayer of claim 2, wherein the compatibilizer comprises a mixture of hexahydrophthalic anhydride and hexahydro-4-methylphthalic anhydride.

* * * * *